(12) United States Patent
Leeman et al.

(10) Patent No.: US 11,960,133 B2
(45) Date of Patent: Apr. 16, 2024

(54) CONVERGED ENCLOSURE

(71) Applicant: Sterlite Technologies Limited, Gurgaon (IN)

(72) Inventors: Sam Leeman, Kessel-Lo (BE); Binod Balachandran, Gurgaon (IN); Shantha Kumar, Gurgaon (IN); Nitin Joshi, Gurgaon (IN)

(*) Notice: Subject to any disclaimer, the term of this patent is extended or adjusted under 35 U.S.C. 154(b) by 0 days.

(21) Appl. No.: 17/719,377

(22) Filed: Apr. 13, 2022

(65) Prior Publication Data

US 2023/0176290 A1 Jun. 8, 2023

(51) Int. Cl.
*G02B 6/44* (2006.01)
*G02B 6/36* (2006.01)

(52) U.S. Cl.
CPC .......... *G02B 6/4441* (2013.01); *G02B 6/3616* (2013.01); *G02B 6/444* (2013.01)

(58) Field of Classification Search
CPC ....................... G02B 6/444–4452; H04Q 1/13
See application file for complete search history.

(56) References Cited

U.S. PATENT DOCUMENTS

| | | | | |
|---|---|---|---|---|
| 5,011,257 A * | 4/1991 | Wettengel | ............ | G02B 6/4454 385/53 |
| 5,463,706 A * | 10/1995 | Dumont | ............... | G02B 6/4459 385/127 |
| 5,605,466 A * | 2/1997 | Devlin | ............... | H01R 13/6395 439/954 |
| D421,965 S * | 3/2000 | Johnston | ...................... | D13/147 |
| 6,234,836 B1 * | 5/2001 | Schmidt | ............... | H01R 13/743 439/676 |
| 6,250,816 B1 * | 6/2001 | Johnston | .............. | G02B 6/4452 385/53 |
| 7,591,676 B2 * | 9/2009 | Martich | ................. | H04Q 1/066 439/540.1 |
| 10,164,389 B2 * | 12/2018 | Wang | .................. | H01R 13/502 |
| 2004/0219829 A1 * | 11/2004 | Clark | ................... | H01R 25/006 439/540.1 |

(Continued)

FOREIGN PATENT DOCUMENTS

EP 0943944 A1 * 9/1999
EP 4063929 A1 * 9/2022

OTHER PUBLICATIONS

Extended European Search Report for application 22162936.3, dated Aug. 25, 2022. (Year: 2022).*

*Primary Examiner* — Michael Stahl
(74) *Attorney, Agent, or Firm* — Steven R. Fairchild; Michael Pennington

(57) ABSTRACT

A converged enclosure is provided. The converged enclosure comprises a base panel, a housing coupled with the base panel and a plurality of ports housed on a front surface of the housing. The plurality of ports is arranged in a plurality of rows such that each row has one or more ports. The one or more ports in each of the plurality of rows is inclined at a predefined row angle (R1, R2, R3, R4) from a vertical base axis such that the predefined row angle of each of the plurality of rows is different. The plurality of ports is arranged in a plurality of columns such that each column has one or more ports. The one or more ports in each of the plurality of columns is inclined at a predefined column angle (C1, C2, C3) from a horizontal base axis such that the predefined column angle of each of the plurality of columns is different.

10 Claims, 9 Drawing Sheets

(56) References Cited

U.S. PATENT DOCUMENTS

| | | | | |
|---|---|---|---|---|
| 2005/0233635 | A1* | 10/2005 | Denovich | H04Q 1/062 439/540.1 |
| 2006/0194470 | A1* | 8/2006 | Caveney | H04Q 1/068 439/540.1 |
| 2007/0189694 | A1* | 8/2007 | Mullaney | G02B 6/4441 385/135 |
| 2007/0196071 | A1* | 8/2007 | Laursen | G02B 6/3897 385/135 |
| 2009/0067800 | A1* | 3/2009 | Vazquez | A47B 46/00 385/135 |
| 2009/0148118 | A1* | 6/2009 | Gronvall | G02B 6/4441 385/135 |
| 2009/0163043 | A1* | 6/2009 | Demers | H04Q 1/062 439/43 |
| 2010/0226654 | A1* | 9/2010 | Smith | G02B 6/4292 398/116 |
| 2012/0051708 | A1* | 3/2012 | Badar | G02B 6/4453 385/135 |
| 2013/0122742 | A1* | 5/2013 | Lin | H01R 13/518 439/540.1 |
| 2014/0179152 | A1* | 6/2014 | Lin | H01R 4/26 439/387 |
| 2014/0370226 | A1* | 12/2014 | Cole | H04Q 1/13 428/53 |
| 2019/0008075 | A1* | 1/2019 | Chen | H05K 7/1452 |

\* cited by examiner

CONVERGED ENCLOSURE

BACKGROUND OF THE INVENTION

Field of the Invention

The present disclosure relates to optical communication networks and devices, and more specifically relates to a converged enclosure for use in the optical communication networks.

Description of the Related Art

Optical communication networks play a vital role in today's networking infrastructure and long-haul communication. The optical communication networks are designed to meet the demands, such as high bandwidth, of end-users that leads to data, video, audio, or the like transmissions. Endeavours to meet the demands and to provide high bandwidth have been made using various techniques such as digital subscriber line, asynchronous digital subscriber line, integrated services digital network or the like. However, these conventional techniques fail to provide adequate bandwidth as well as are not economical for all the end-users.

With the advent of technology, passive optical networks (PONS) have been introduced to achieve higher bandwidth and to solve aforesaid issues of the conventional techniques. Usually, in the PONS, optical fibers are deployed between a service provider's central office (i.e. head end) and the end-users' premises. The PONS utilizes passive optical components, such as, but not limited to, splitters, splices, connectors between a service provider and an end-user premise. The deployed optical fibers are split using the splitters to disperse signals from an input fiber to multiple output fibers via a convergence point in the PON. Typically, the optical fibers may be routed to the end-users' premises using connectorized block enclosures or terminals. The connectorized block enclosures or terminals are also known as fiber drop terminals and may be mounted on poles or walls, in junction boxes, in below-grade vaults or the like.

Generally, the connectorized block enclosures or terminals comprise a plurality of ports or receptacles. When the connectorized block enclosures or terminals are installed on a pole or a wall and optical fiber cables are connected to the plurality of ports, the optical fiber cables are scattered and thus, are difficult to bunch together. The conventional connectorized block enclosures or terminals do not have an appropriate design to allow the optical fiber cables to converge together properly and to have a congruent flow.

Accordingly, the present invention seeks to ameliorate one or more of the aforementioned disadvantages by providing a converged enclosure.

BRIEF SUMMARY OF THE INVENTION

The primary objective of the present disclosure is to provide a converged enclosure.

Another objective of the present disclosure is to provide a multi-port converged enclosure that allows optical fiber cables to converge together and to have a congruent flow.

Accordingly, a converged enclosure is disclosed. The converged enclosure comprises a base panel defined by a base axis, a housing coupled with the base panel and a plurality of ports housed on a front surface of the housing. The plurality of ports is arranged in a plurality of rows such that each row has one or more ports. The one or more ports in each of the plurality of rows is inclined at a predefined row angle from a vertical base axis such that the predefined row angle of each of the plurality of rows is different. Further, the plurality of ports is arranged in a plurality of columns such that each column has one or more ports. The one or more ports in each of the plurality of columns is inclined at a predefined column angle from a horizontal base axis such that the predefined column angle of each of the plurality of columns is different. The plurality of ports is downwardly inclined and inwardly inclined. The predefined row angle of each of the plurality of rows increases from a top row to a bottom row of the converged enclosure. In an aspect, the converged enclosure has at least one of: a difference between the predefined row angle is 1-10 degrees and a difference between the predefined column angle is 1-20 degrees.

These and other aspects herein will be better appreciated and understood when considered in conjunction with the following description and the accompanying drawings. It should be understood, however, that the following descriptions are given by way of illustration and not of limitation. Many changes and modifications may be made within the scope of the invention herein without departing from the spirit thereof.

DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
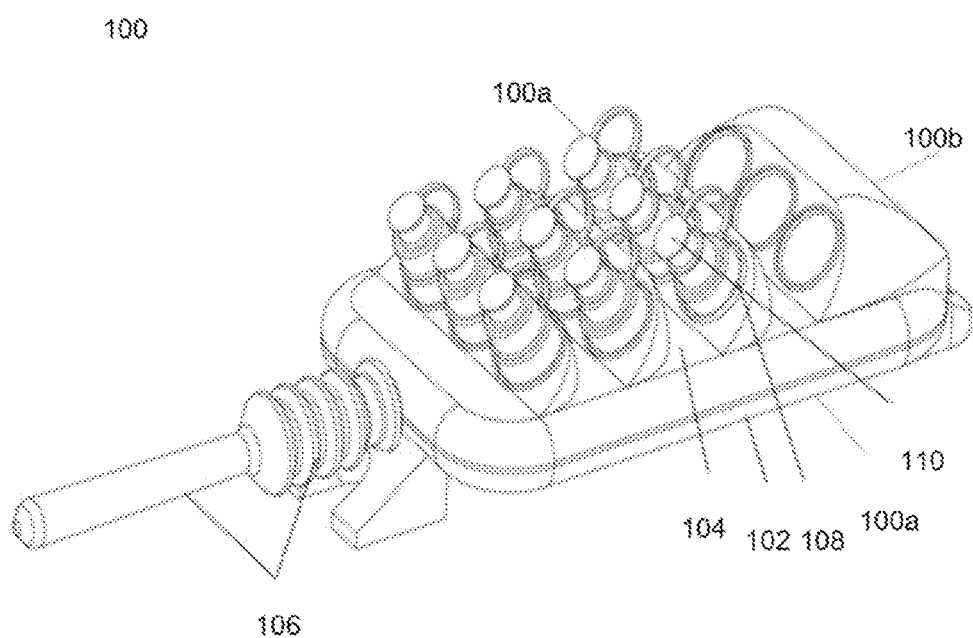
FIG. 1 is a perspective view of a converged enclosure.

It should be noted that the accompanying figures are intended to present illustrations of few exemplary embodiments of the present disclosure. These figures are not intended to limit the scope of the present disclosure. It should also be noted that accompanying figures are not necessarily drawn to scale.

REFERENCE NUMERALS IN THE DRAWINGS

For a more complete understanding of the present invention parts, reference is now made to the following descriptions:

100. Perspective view of a converged enclosure.
100a. Horizontal base axis.
100b. Vertical base axis.
102. Base panel.
104. Housing.

106. Receiving channel.
108. A plurality of ports.
110. A plurality of plugs.
112a. The top row.
114a. The second row.
116a. The third row.
118a. The fourth row.
112b. The first column.
114b. The second column.
116b. The third column.
120. Single point.
R1. The first row angle.
R2. The second row angle.
R3. The third row angle.
R4. The fourth row angle.
C1. The first column angle.
C2. The second column angle.
C3. The third column angle.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

Conditional language used herein, such as, among others, "can," "may," "might," "may," "e.g.," and the like, unless specifically stated otherwise, or otherwise understood within the context as used, is generally intended to convey that certain alternatives while other alternatives do not include, certain features, elements and/or steps. Thus, such conditional language is not generally intended to imply that features, elements and/or steps are in any way required for one or more alternatives or that one or more alternatives necessarily include logic for deciding, with or without other input or prompting, whether these features, elements and/or steps are included or are to be performed in any particular alternative. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain alternatives require at least one of X, at least one of Y, or at least one of Z to each be present.

The accompanying drawings are used to help easily understand various technical features and it should be understood that the alternatives presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Unlike conventional connectorized block enclosure or terminal, the converged enclosure of the present disclosure is a multi-port converged enclosure that allows optical fiber cables to converge together, a technical effect of which is an efficient and clean bunching (bundling) and a congruent natural flow of the optical fiber cables.

Referring now to the drawings, and more particularly to FIGS. 1 through 4, there are shown preferred embodiments.

Figure 1A:
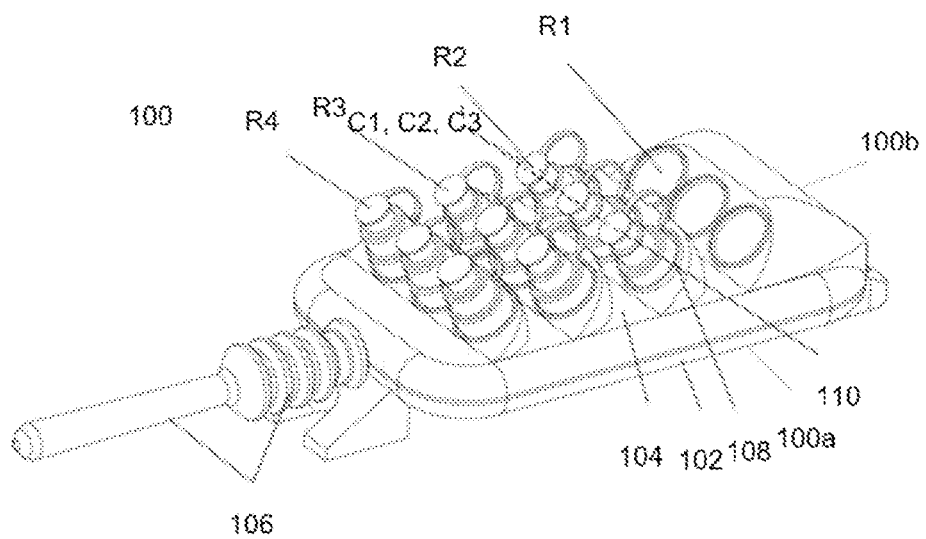
FIG. 1a is the perspective view of the converged enclosure depicting a plurality of angles.
Figure 1B:
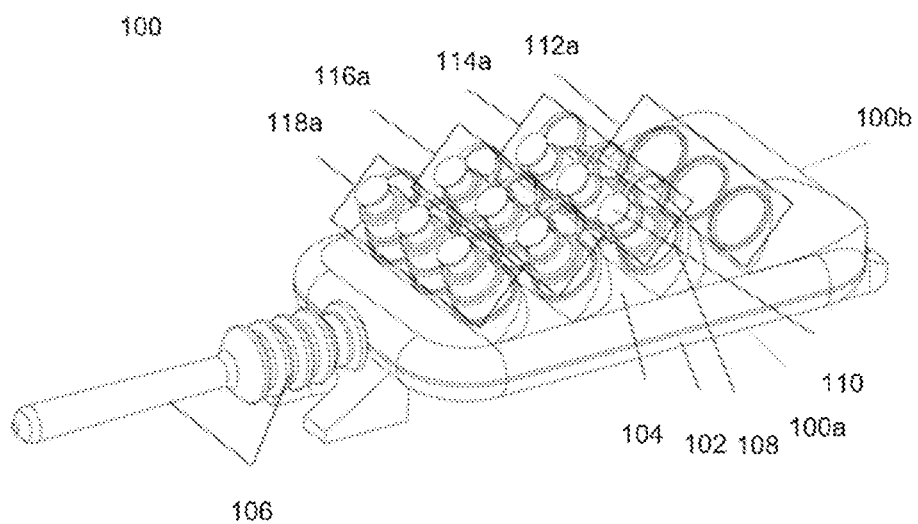
FIG. 1B is the perspective view of the converged enclosure depicting a plurality of rows.
Figure 1C:
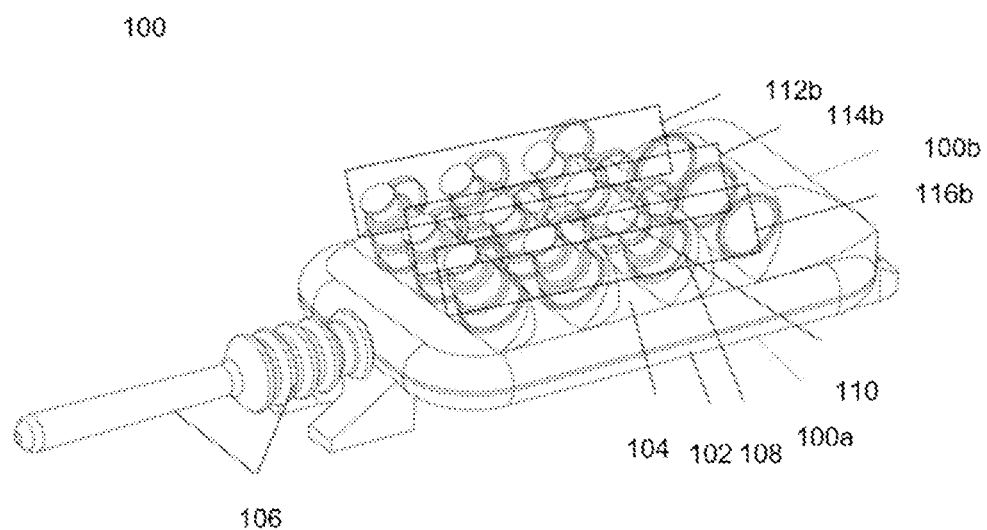
FIG. 1c is the perspective view of the converged enclosure depicting a plurality of columns.
Figure 2:
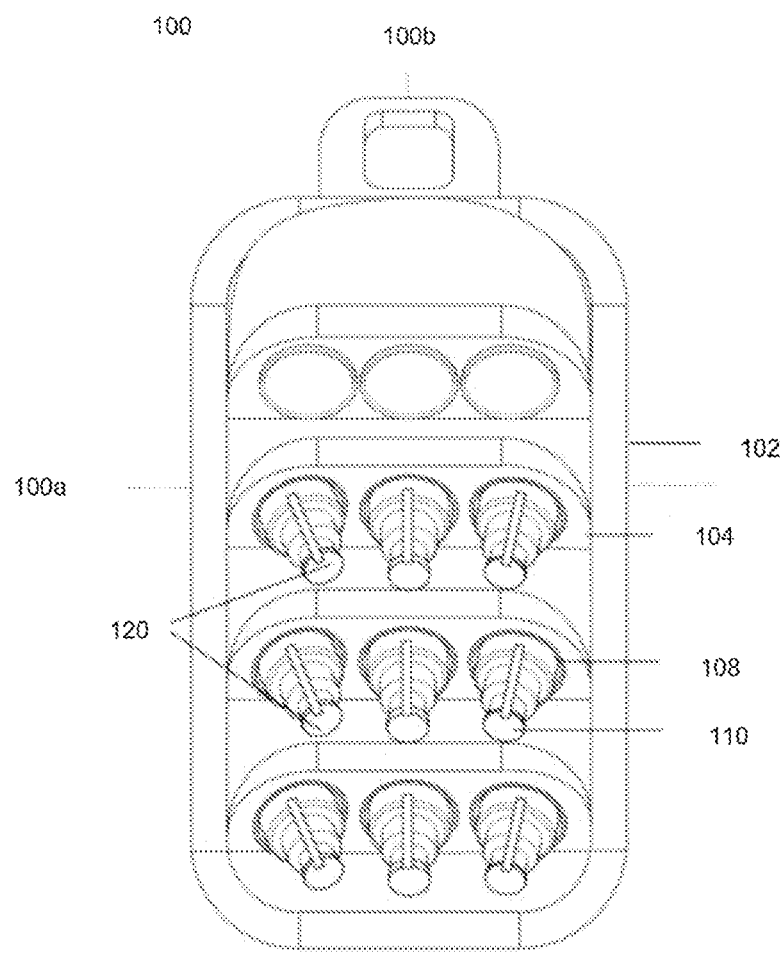
FIG. 2 is a front view of the converged enclosure.
Figure 2A:
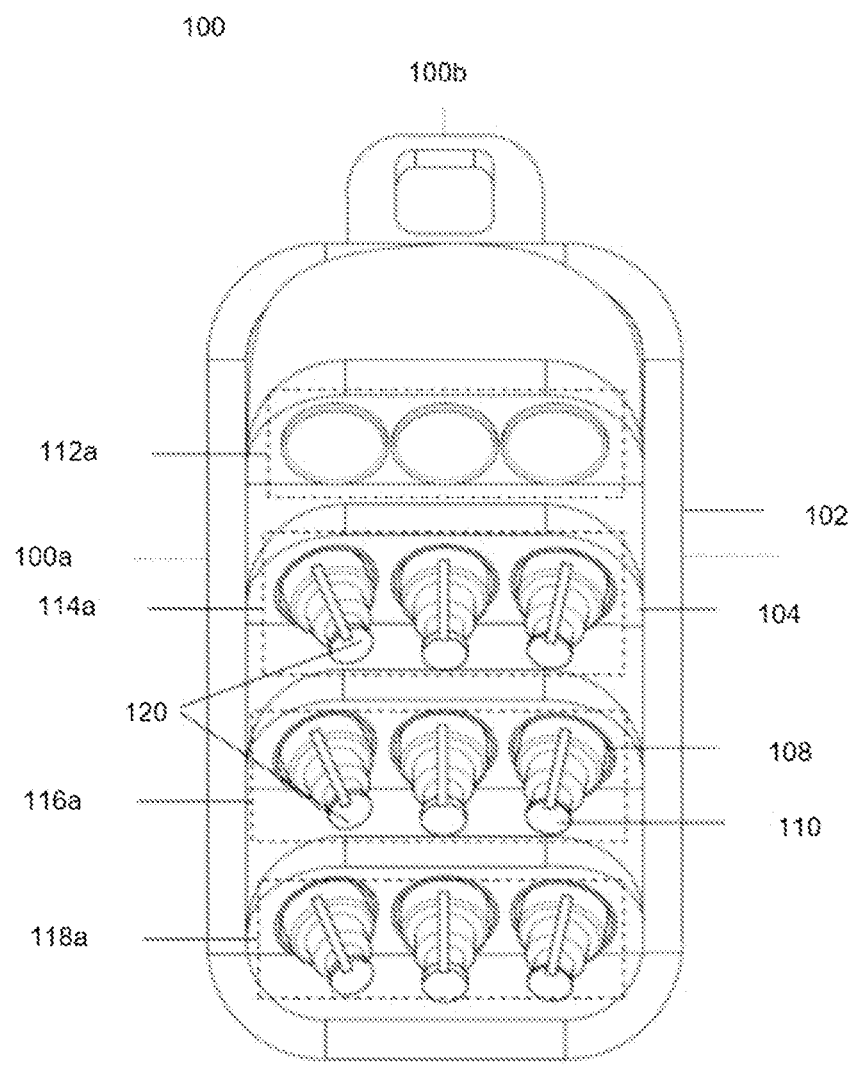
FIG. 2a is the front view of the converged enclosure depicting the plurality of rows.
Figure 2B:
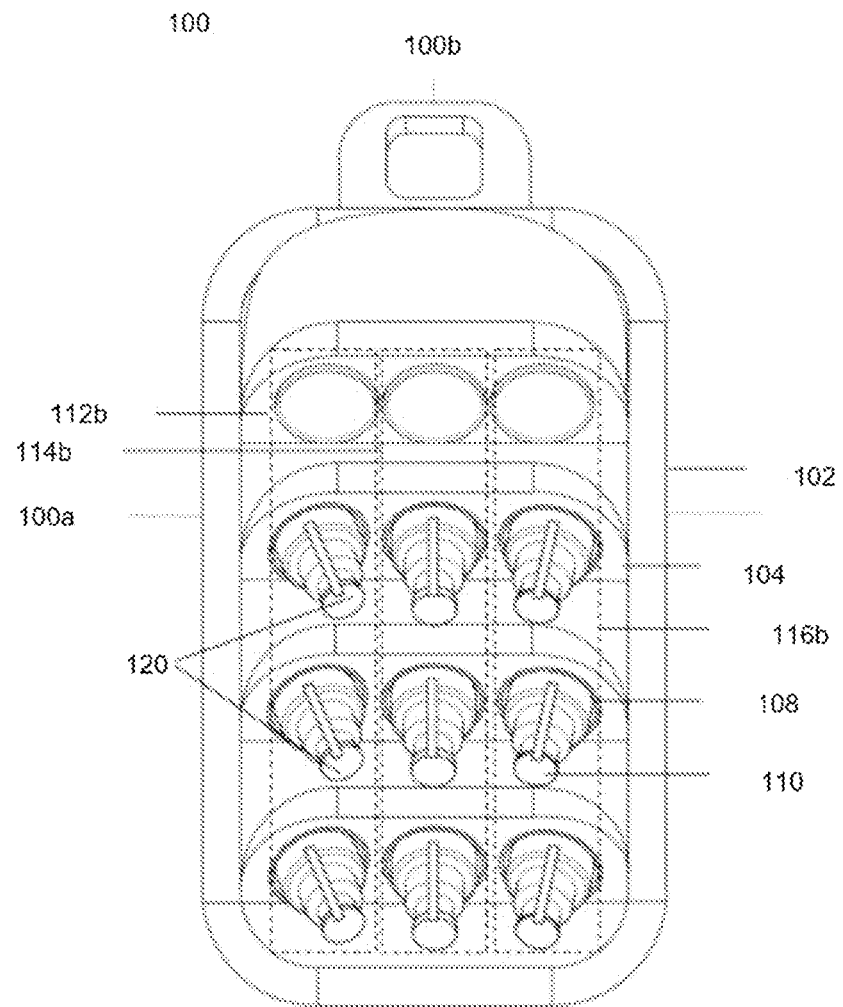
FIG. 2b is the front view of the converged enclosure depicting the plurality of columns.
Figure 3:
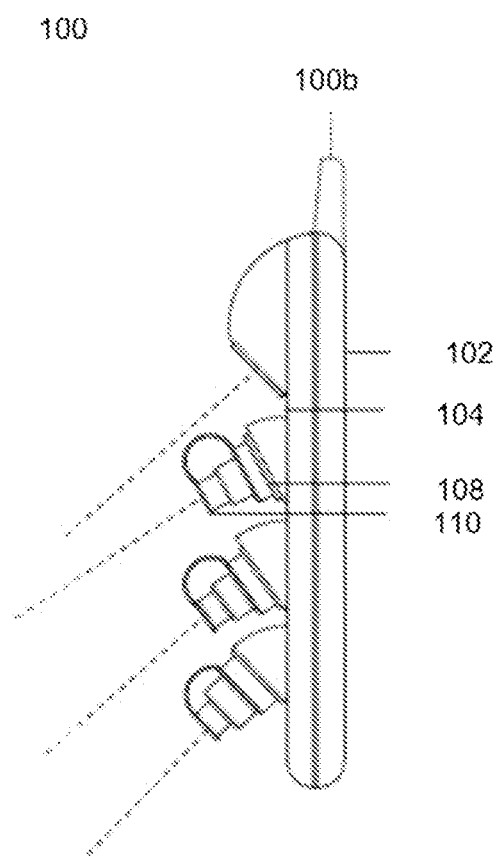
FIG. 3 is a side view of the converged enclosure.
Figure 4:
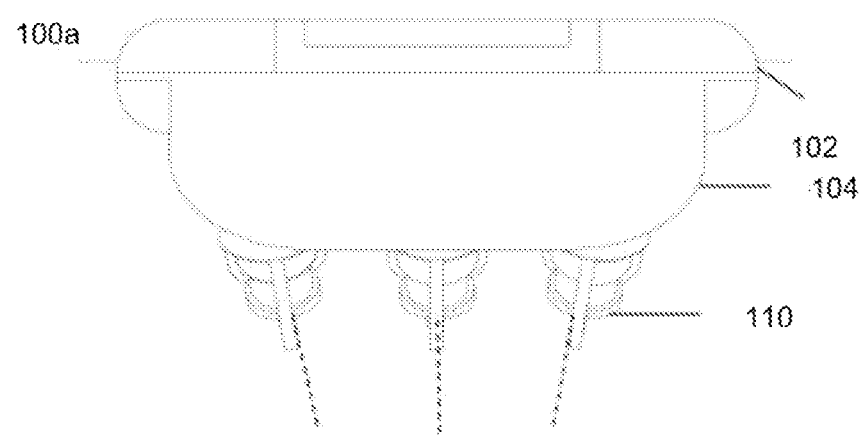
FIG. 4 is a top view of the converged enclosure.

FIG. 1 is a perspective view of a converged enclosure (100). FIG. 1a is the perspective view of the converged enclosure (100) depicting a plurality of angles (R1, R2, R3, R4, C1, C2, C3). FIG. 1b is the perspective view of the converged enclosure (100) depicting a plurality of rows (112a, 114a, 116a, 118a). FIG. 1c is the perspective view of the converged enclosure (100) depicting a plurality of columns (112b, 114b, 116b). FIG. 2 is a front view of the converged enclosure (100). FIG. 2a is the front view of the converged enclosure (100) depicting the plurality of rows (112a, 114a, 116a, 118a). FIG. 2b is the front view of the converged enclosure (100) depicting the plurality of columns (112b, 114b, 116b). FIG. 3 is a side view of the converged enclosure (100). FIG. 4 is a top view of the converged enclosure (100).

In passive optical networks or fiber access networks, an optical fiber may be routed to a user's premise via the converged enclosure (100). The converged enclosure (100) may be made of plastic or other suitable materials. Further, the converged enclosure (100) may be made ultra-violet and weather resistant to avoid damages caused by outside environment. The converged enclosure (100) may be deployed in or mounted on infrastructures such as poles, pedestal or the like.

The converged enclosure (100) may include a base panel (102) and a housing (104) coupled with the base panel (102). Further, the converged enclosure (100) may include a receiving channel (106).

The base panel (102) is defined by a base axis. The base axis may include a horizontal base axis (100a) (shown with dotted line) and a vertical base axis (100b) (shown with dotted line). The base panel (102) may usually be of flat shape. Other shapes are also possible. The base panel (102) may be installed or mounted on poles, walls or any suitable infrastructures using, fasteners, screws, adhesives or the like. The base panel (102) may be configured to retain a sealing device, such as gasket or the like, along a base mounting platform. The base mounting platform may be coupled to a housing mounting platform of the housing (104). In an implementation, the housing (104) may be permanently coupled to the base panel (102). In another implementation, the housing (104) may be releasably attached to the base panel (102). The housing (104) may be coupled to the base panel (102) by, but not limited to, fasteners, screws, retainers, snap-in configuration.

An inner cavity of the housing (104) has enough space to allow placement, management and storage of a plurality of optical fibers. The housing (104) may include a plurality of ports (108) on its front surface. The plurality of ports (108) is an output port or output receptacle. The plurality of ports (108) may include capability of receiving a connector. The plurality of ports (108) may include a plurality of plugs (110) to prevent the plurality of optical fibers getting damaged from moisture or dirt. That is, each of the plurality of ports (108) may include it's corresponding plug. The plurality of ports (108) may receive the plurality of optical fibers via the receiving channel (106).

Generally, the optical fiber refers to a medium associated with signal transmission over long distances in the form of light pulses. The plurality of optical fibers may be single-mode optical fibers or multi-mode optical fibers. The plurality of optical fibers may be of ITU.T G.657A1 category. Alternatively, the plurality of optical fibers may be of ITU.T G.657A2 category. Alternatively, the plurality of optical fibers may be of G.657B3 category. Alternatively, the plurality of optical fibers may be of G.652D category. Alternatively, the plurality of optical fibers may be of any other category.

Referring back to the figures, the plurality of ports (108) may be 4, 6, 8, 10, 12 or the like arranged inwardly inclined and downwardly inclined (as shown in FIG. 1a). The plurality of ports (108) may be utilized as per the requirement. The plurality of ports (108) may be arranged in the plurality of rows (112a, 114a, 116a, 118a) (as shown in FIGS. 1b and 2). For illustration purposes, only four rows (112a, 114a, 116a, 118a) have been shown. Other variations are also possible. Each of the plurality of rows (112a, 114a, 116a, 118a) is designed to incline downwardly at a predefined row angle to guide the optical fiber cables connected to the plurality of ports (108), wherein the optical fiber cables are guided with a downwardly predefined inclined angle (R1, R2, R3, R4) to flow down as shown in FIG. 1a. In an implementation, the optical fiber cables may be drop cables. In another implementation, the optical fiber cables may be any other cable.

The plurality of rows (112a, 114a, 116a, 118a) may include a first row (112a), a second row (114a), a third row (116a) and a fourth row (118a), where the first row (112a) is a top row and the fourth row (118a) is a bottom row of the converged enclosure (100) as shown in FIG. 1B and FIG. 2a. In an implementation, the first row (112a) may have a first row angle R1, the second row (114a) may have a second row angle R2, the third row (116a) may have a third row angle R3 and the fourth row (118a) may have a fourth row angle R4 (as shown in FIGS. 1a, 1b and 2a). The first row angle R1, the second row angle R2, the third row angle R3 and the fourth row angle R4 may be downwardly inclined at the predefined row angle (R1, R2, R3, R4) in an increasing order (from top row to bottom row of converged enclosure). That is, the predefined row angle (R1, R2, R3, R4) of each of the plurality of rows (112a, 114a, 116a, 118a) increases from a top row (112a) to a bottom row (118a) of the converged enclosure (100).

The predefined row angle (R1, R2, R3, R4) is measured from the vertical base axis (100b). That is, the first row angle R1 may be 33 degree, the second row angle R2 may be 36 degree, the third row angle R3 may be 39 degree, the fourth row angle R4 may be 42 degree, a fifth row angle of a fifth row (not shown) may be 45 degree and so on. Alternatively, the predefined row angle (R1, R2, R3, R4) may be in decreasing order from the top row (112a) to the bottom row (118a). A difference between the predefined row angle (R1, R2, R3, R4) may be 1-10 degrees.

In an implementation, the plurality of ports (108) is defined by the plurality of angles (R1, R2, R3, R4, C1, C2, C3) as shown in FIG. 1a. In other words, the plurality of ports (108) may be designed to have the plurality of angles i.e., downwardly inclined angles and inwardly inclined angles as shown in FIG. 1a, thus may be designed to have a plurality of directions. That is, one or more ports (108) in the first row (112a) may have the first row angle R1, the one or more ports (108) in the second row (114a) may have the second row angle R2, the one or more ports (108) in the third row (116a) may have the third row angle R3 and the one or more ports (108) in the fourth row (118a) may have the fourth row angle R4. That is, the plurality of ports (108) is arranged in the plurality of rows (112a, 114b, 116c, 118d) such that each row has one or more ports (108) and the one or more ports (108) in each of the plurality of rows is inclined at the predefined row angle (R1, R2, R3, R4) from the vertical base axis (100b) such that the predefined row angle (R1, R2, R3, R4) of each of the plurality of rows (112a, 114b, 116c, 118d) is different. The predefined row angle (R1, R2, R3, R4) of each of the plurality of rows (112a, 114b, 116c, 118d) increases from the top row (112a) to the bottom row (118a) of the converged enclosure (100) along the vertical base axis (100b). In an example, the first row angle R1, the second row angle R2, the third row angle R3 and the fourth row angle R4 may be in increasing order (top row to bottom row of converged enclosure). The first row angle R1 may be 33 degree, the second row angle R2 may be 36 degree, the third row angle R3 may be 39 degree, the fourth row angle R4 may be 42 degree, a fifth row angle (not shown) may be 45 degree and so on when measured from the vertical base axis (100b). Alternatively, the predefined row angle (R1, R2, R3, R4) of each of the plurality of rows (112a, 114b, 116c, 118d) decreases from the top row (112a) to the bottom row (118a) of the converged enclosure (100) along the vertical base axis (100b).

FIG. 1c and FIG. 2b show the converged enclosure (100) having the plurality of the ports (108) arranged in the plurality of columns (112b, 114b, 116b). The plurality of columns (112b, 114b, 116b) may include a first column (112b), a second column (114b) and a third column (116b) such that each column has the one or more ports (108). The first column (112b) may have a first column angle θ1, the second column (114b) may have a second column angle C2, the third column (116b) may have a third column angle C3 as shown in FIG. 1a. That is, the one or more ports (108) in each of the plurality of columns (112b, 114b, 116b) is inclined at a predefined column angle (01, C2, C3) from the horizontal base axis (100a) such that the predefined column angle (C1, C2, C3) of each of the plurality of columns is different. Further, the one or more ports (108) in each of the plurality of columns is inclined at the predefined column angle (C1, C2, C3) from the horizontal base axis (100a) such that the plurality of ports (108) is inwardly inclined.

In other words, the first column angle C1, the second column angle C2 and the third column angle C3 may be inwardly inclined towards each other at a same or different angles. A difference between the predefined column angle (01, C2, C3) is 1-20 degrees.

As mentioned earlier, the plurality of ports (108) on the converged enclosure (100) has the plurality of angles, that means the plurality of angles may represent the plurality of directions (downwardly inclined and inwardly inclined). The plurality of directions may be two or more. The plurality of directions of the plurality of ports (108) guides the optical fiber cables that are connected to the converged enclosure (100) to converge in one narrow flow down.

To achieve convergence of the optical fiber cables connected to the converged enclosure (100), the plurality of ports (108) seen from the front-view (FIG. 2) may point towards each other to center the optical fiber cables at one single point (120), i.e. middle point of the converged enclosure (100), while the optical fiber cables are routed downwards to reach the infrastructure such as pole, wall or the like to which the converged enclosure (100) is mounted.

Further, to achieve convergence, the plurality of ports (108) is made to have the plurality of angles and is made downwardly inclined and inwardly inclined that allows the optical fiber cables to run downwards naturally, where the plurality of angles vary from the top row to the bottom row of the converged enclosure (100) as described above. Furthermore, the plurality of angles from top to bottom may slightly be increased to again bundle the optical fiber cables together into one congruent flow.

Advantageously, the plurality of the ports (108) arranged in downwardly inclined angles and inwardly inclined angles may individually or combinedly be used to achieve a natural flow of the optical fiber cables. The present disclosure ensures convergence of the optical fiber cables for easy bunching by proposing the concept of the plurality of angles in fiber-to-the-x (FTTX). The plurality of angles are provided in such a manner that allows easy access to the plurality of ports (108) all times for easy service provisioning by inserting the connector(s) of the optical fiber cables into the plurality of ports (108).

While the detailed description has shown, described, and pointed out novel features as applied to various alternatives, it can be understood that various omissions, substitutions, and changes in the form and details of the devices or algorithms illustrated can be made without departing from the scope of the disclosure. As can be recognized, certain alternatives described herein can be embodied within a form that does not provide all of the features and benefits set forth herein, as some features can be used or practiced separately from others.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

Although the present disclosure has been explained in relation to its preferred embodiment(s) as mentioned above, it is to be understood that many other possible modifications and variations can be made without departing from the spirit and scope of the inventive aspects of the present invention. It is, therefore, contemplated that the appended claim or claims will cover such modifications and variations that fall within the true scope of the invention.

What is claimed is:

1. A converged enclosure comprising:
    a base panel defined by a base axis;
    a housing coupled with the base panel; and
    a plurality of ports housed on a front surface of the housing, wherein the plurality of ports is arranged in a plurality of rows such that each row has one or more ports, the one or more ports in each of the plurality of rows is inclined at a predefined row angle (R1, R2, R3, R4) from a vertical base axis such that the predefined row angle (R1, R2, R3, R4) of each of the plurality of rows is different,
    wherein the plurality of ports is arranged in a plurality of columns such that each column has the one or more ports, the one or more ports in each of the plurality of columns is inclined at a predefined column angle (C1, C2, C3) from a horizontal base axis,
    wherein a difference between the predefined row angle (R1, R2, R3, R4) is 1-10 degrees and a difference between the predefined column angle (C1, C2, C3) is 1-20 degrees.

2. The converged enclosure as claimed in claim 1, wherein the plurality of ports is downwardly inclined.

3. The converged enclosure as claimed in claim 1, wherein the predefined row angle (R1, R2, R3, R4) of each of the plurality of rows increases from a top row to a bottom row of the converged enclosure.

4. The converged enclosure as claimed in claim 1, wherein the one or more ports in each of the plurality of columns is inclined at the predefined column angle (C1, C2, C3) from the horizontal base axis such that the predefined column angle (C1, C2, C3) of each of the plurality of columns is different.

5. The converged enclosure (100) as claimed in claim 1, wherein the plurality of ports (108) is arranged in the plurality of columns (112 b, 114 b, 116 b) such that each column has the one or more ports (108), the one or more ports (108) in each of the plurality of columns is inclined at the predefined column angle (C1, C2, C3) from the horizontal base axis (100 a) such that the plurality of ports (108) is inwardly inclined.

6. A converged enclosure comprising:
  a base panel defined by a base axis;
  a housing coupled with the base panel; and
  a plurality of ports housed on a front surface of the housing, wherein the plurality of ports is arranged in a plurality of columns such that each column has one or more ports, the one or more ports in each of the plurality of columns is inclined at a predefined column angle (C1, C2, C3) from a horizontal base axis such that the predefined column angle (C1, C2, C3) of each of the plurality of columns is different,
  wherein the plurality of ports is arranged in a plurality of rows such that each row has the one or more ports, the one or more ports in each of the plurality of rows is inclined at a predefined row angle (R1, R2, R3, R4) from a vertical base axis such that the predefined row angle (R1, R2, R3, R4) of each of the plurality of rows is different.

7. The converged enclosure as claimed in claim 6, wherein the plurality of ports is downwardly inclined.

8. The converged enclosure as claimed in claim 6, wherein the predefined row angle (R1, R2, R3, R4) of each of the plurality of rows increases from a top row to a bottom row of the converged enclosure.

9. The converged enclosure as claimed in claim 6, wherein the plurality of ports is inwardly inclined.

10. The converged enclosure as claimed in claim 6, wherein at least one of: a difference between the predefined row angle (R1, R2, R3, R4) is 1-10 degrees and a difference between the predefined column angles (C1, C2, C3) is 1-20 degrees.

* * * * *